US007157130B2

(12) United States Patent
Bostdorf

(10) Patent No.: US 7,157,130 B2
(45) Date of Patent: Jan. 2, 2007

(54) OFFSET DIECUT STACK

(75) Inventor: David E. Bostdorf, Mount Joy, PA (US)

(73) Assignee: NCR Corporation, Dayton, OH (US)

( * ) Notice: Subject to any disclaimer, the term of this patent is extended or adjusted under 35 U.S.C. 154(b) by 177 days.

(21) Appl. No.: 10/668,381

(22) Filed: Sep. 23, 2003

(65) Prior Publication Data

US 2005/0064434 A1 Mar. 24, 2005

(51) Int. Cl.

| | |
|---|---|
| ***B32B 3/24*** | (2006.01) |
| ***B65H 35/02*** | (2006.01) |
| ***B65H 5/00*** | (2006.01) |
| *B41J 13/00* | (2006.01) |
| *B26D 7/32* | (2006.01) |

(52) U.S. Cl. ...................... 428/136; 428/132; 428/133; 428/138; 83/29; 83/86; 83/88; 83/102; 347/104; 271/1; 271/8.1; 234/46

(58) Field of Classification Search ................ 428/138, 428/136, 132, 133; 271/1, 8.1; 83/29, 86, 83/88, 102; 347/104; 234/46
See application file for complete search history.

(56) References Cited

U.S. PATENT DOCUMENTS

| | | | | |
|---|---|---|---|---|
| 3,900,629 | A * | 8/1975 | Spencer | 428/593 |
| 4,331,254 | A * | 5/1982 | Haggerty | 220/229 |
| 5,062,340 | A * | 11/1991 | Greven | 83/95 |
| 5,447,299 | A * | 9/1995 | May | 271/1 |

* cited by examiner

*Primary Examiner*—William P. Watkins, III
(74) *Attorney, Agent, or Firm*—Francis L. Conte

(57) ABSTRACT

A stack of alternating sheets includes repeating diecuts offset among the sheets. The sheets may be made from a continuous web using a die to cut the repeating diecuts along the running axis of the web. Individual sheets are cut from the web and stacked with the diecuts offset from each other in turn. The stack of sheets may be loaded into a printer and fed individually therethrough, with the offset diecuts preventing interlocking therebetween.

25 Claims, 3 Drawing Sheets

OFFSET DIECUT STACK

BACKGROUND OF THE INVENTION

The present invention relates generally to stationery products, and, more specifically, to die cut sheets.

Stationery products are typically manufactured in large quantities from a large roll of suitable material defining a web. The web is transported along a running axis for producing therein individual sheets for the desired product. The different types of sheets are innumerable and vary in material composition, configuration, and size as desired for a particular application.

Typical sheets are rectangular and may include continuous diecuts, lines of perforations, micro-perforations, fold lines, and printing thereon as desired. The sheets may be single ply without a liner, or may be double ply with a liner. The liner is typically a silicone release liner which protects pressure sensitive adhesive on the back side of the face ply. The face ply is typically diecut to form individual pressure sensitive labels which are ubiquitous in the stationery industry.

Single ply sheets include the ubiquitous printing paper manufactured in various sizes for various uses. Printing paper may have various configurations for specialty applications for various commercial or consumer applications.

In one commercial application a single sheet includes diecuts extending therethrough, and therefore a stack of such diecut sheets includes identical diecuts aligned together throughout the entire stack. Since the diecuts extend through the individual sheets they necessarily provide a continuous cut through the stack of sheets. Since the diecut line is a local interruption in the otherwise smooth and continuous surface of the sheet, the stacked diecuts may snag or lock together leading to difficulties in sheet feeding.

For example, a stack of sheets is typically loaded into the storage tray of a printer, and the printer includes a pick up mechanism, such as friction rollers, which remove individual sheets from the stack in turn. If the diecut in one sheet snags the diecut in the next sheet during the feeding process in the printer, the feeding mechanism may not be able to separate one sheet interlocked with the next sheet by the aligned diecuts, or may separate the sheets but may cause undesirable skewing of the initially snagged sheet being fed.

The misfeeding of sheets in printers or copiers is a common problem known to all, and typically occurs due to friction between the stacked sheets rendered worse under high humidity conditions. Sheet feeding mechanisms are available in various configurations and complexity for feeding individual sheets and avoiding multiple sheet feeding in the printer or copier. Although successive sheets may be separated during the feeding process, excess friction therebetween may nevertheless cause undesirable misfeeding or skewing of the sheets through the printing feed path.

Sheets having diecuts extending completely therethrough increase the possibility of undesirable interlocking between the sheets formed in a stack or vertical lamination thereof. The possible interlocking effects of the diecuts depends on the configuration, size, and location thereof in the individual sheets which may cause interlocking or snagging during the feeding process in a printer.

In one exemplary configuration, a hotel folio comprises a single ply rectangular sheet of heavy paper containing therein a diecut band through which a magnetic room key card may be inserted and retained in a cooperating tab formed by a semicircular diecut. The folios are provided to the hotel in a stack thereof which typically includes preprinted information thereon regarding the hotel and its services, and may also be post-printed at the time of reception for adding additional information thereto.

Since the card key receptacle is defined by multiple diecuts, the multiple diecuts increase the possibility of interlocking of the sheets in the printer, which in turn increases the possibility of misfeeding or skewing of the sheets during the check-in procedure. Such misfeed of folio sheets is undesirable because it delays the check-in process and is inconvenient.

Accordingly, it is desired to provide an improved stack of sheets reducing or eliminating the possibility of interlocking of the diecuts therein.

BRIEF SUMMARY OF THE INVENTION

A stack of alternating sheets includes repeating diecuts offset among the sheets. The sheets may be made from a continuous web using a die to cut the repeating diecuts along the running axis of the web. Individual sheets are cut from the web and stacked with the diecuts offset from each other in turn. The stack of sheets may be loaded into a printer and fed individually therethrough, with the offset diecuts preventing interlocking therebetween.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
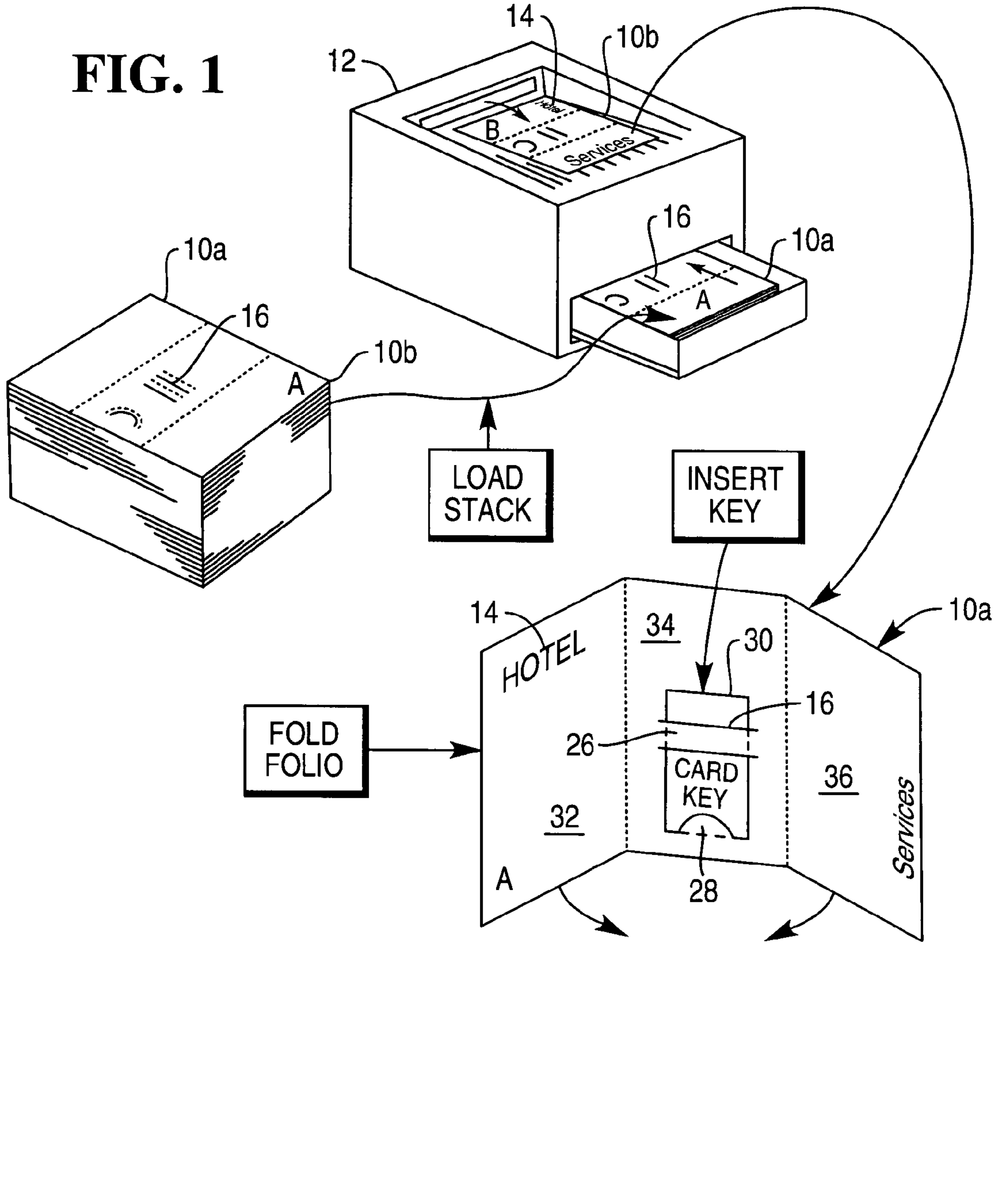
FIG. 1 is a method flowchart illustrating use of an offset diecut stack of sheets in a printer.

Illustrated in FIG. 1 is a stack of alternating flat sheets 10*a, b* configured for use in a conventional printer 12, such as a laser printer or inkjet printer. The stack may have any suitable number of sheets therein typically including hundreds thereof, and is suitably loaded into a storage drawer of the printer 12.

The printer is suitably joined to a conventional computer (not shown) which controls the printing thereof, and the printer is configured for feeding individual sheets through the printer from the stack stored in the drawer thereof. Any desired print 14 may be printed on the individual sheets fed through the printer in a conventional manner.

The stack of sheets illustrated in FIG. 1 has corresponding or repeating diecuts 16 which are offset between the adjoining or adjacent sheets, or among the entire stack of sheets. In this way, the respective diecuts 16 are not aligned with each other from sheet to sheet in the stack for preventing undesirable interlocking thereof which might lead to misfeeding in the printer.

Figure 2:
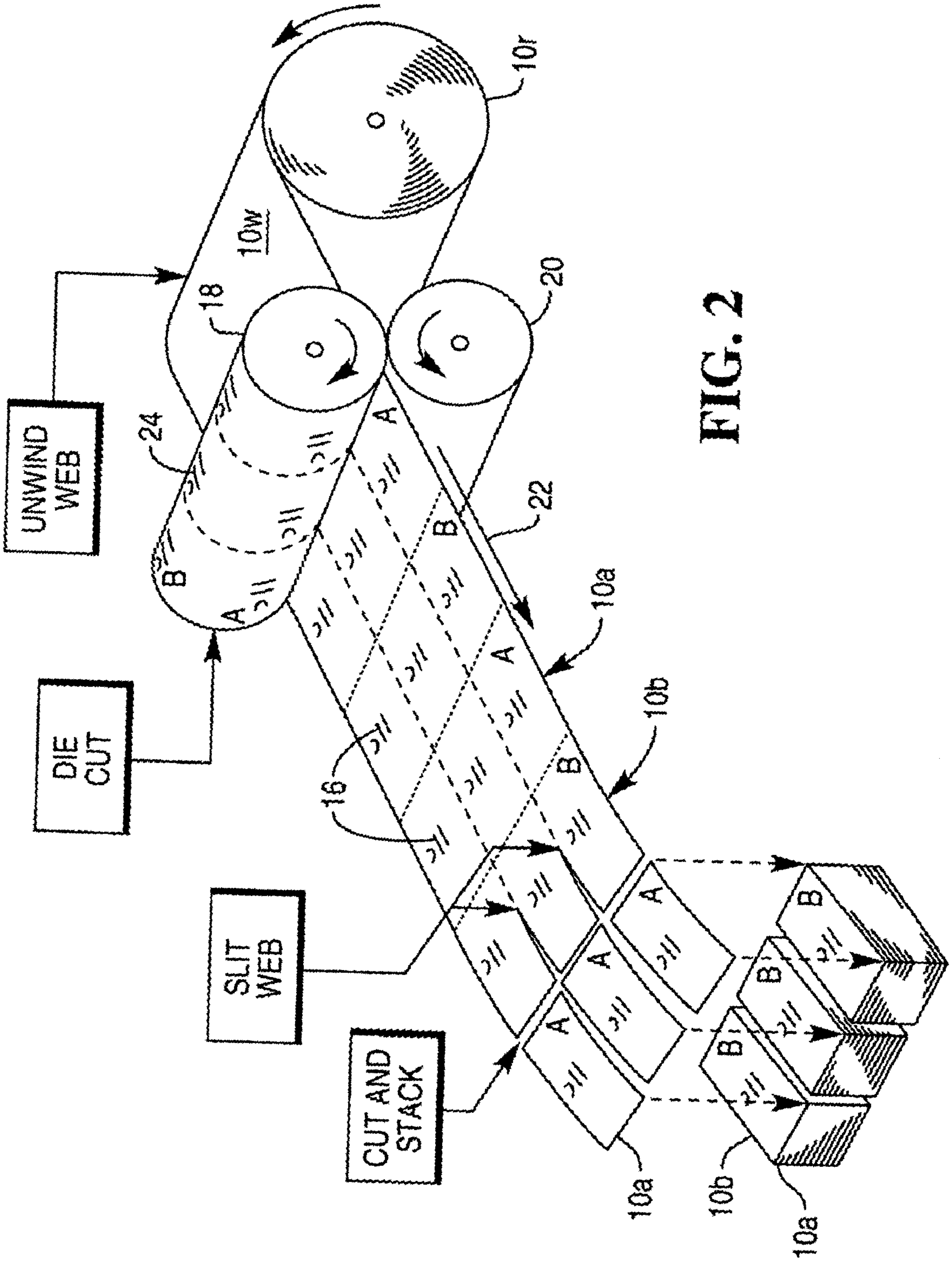
FIG. 2 is a flowchart illustrating an exemplary method of making the stack of sheets illustrated in FIG. 1 from a traveling web.

FIG. 2 illustrates an exemplary method of making the stack of sheets 10*a,b* illustrated in FIG. 1 which commences with a large supply roll 10*r* of the desired sheet material having any conventional composition including paper or synthetics as desired. The roll is mounted in a conventional apparatus which includes suitable means for unwinding a continuous web 10*w* from the supply roll.

A roller die 18 is mounted on one side of the web and cooperates with a roller anvil 20 mounted on the opposite side of the web for die cutting the web low to form therein the repeating diecuts 16 along the longitudinal or running axis 22 of the web being unwound from the roll. The roller die 18 is conventional except for the specific placement of the cutting edges or knives 24 thereon for effecting the offset of the corresponding diecuts 16 in turn as the die rolls along with the longitudinal transport of the continuous web 10*w.*

The apparatus illustrated in FIG. 2 further includes conventional means in the form of slitting knives for cutting the web, with each of the sheets having corresponding diecuts offset from the next successive sheet in the web.

The individual sheets are suitably cut from the common web in a conventional manner and stacked in corresponding groups typically including hundreds of alternating sheets having the offset diecuts therein. For example, a typical stack of sheets for commercial application may include a box of about 2,000 or 2,500 sheets for subsequent use by the intended customer.

Figure 3:
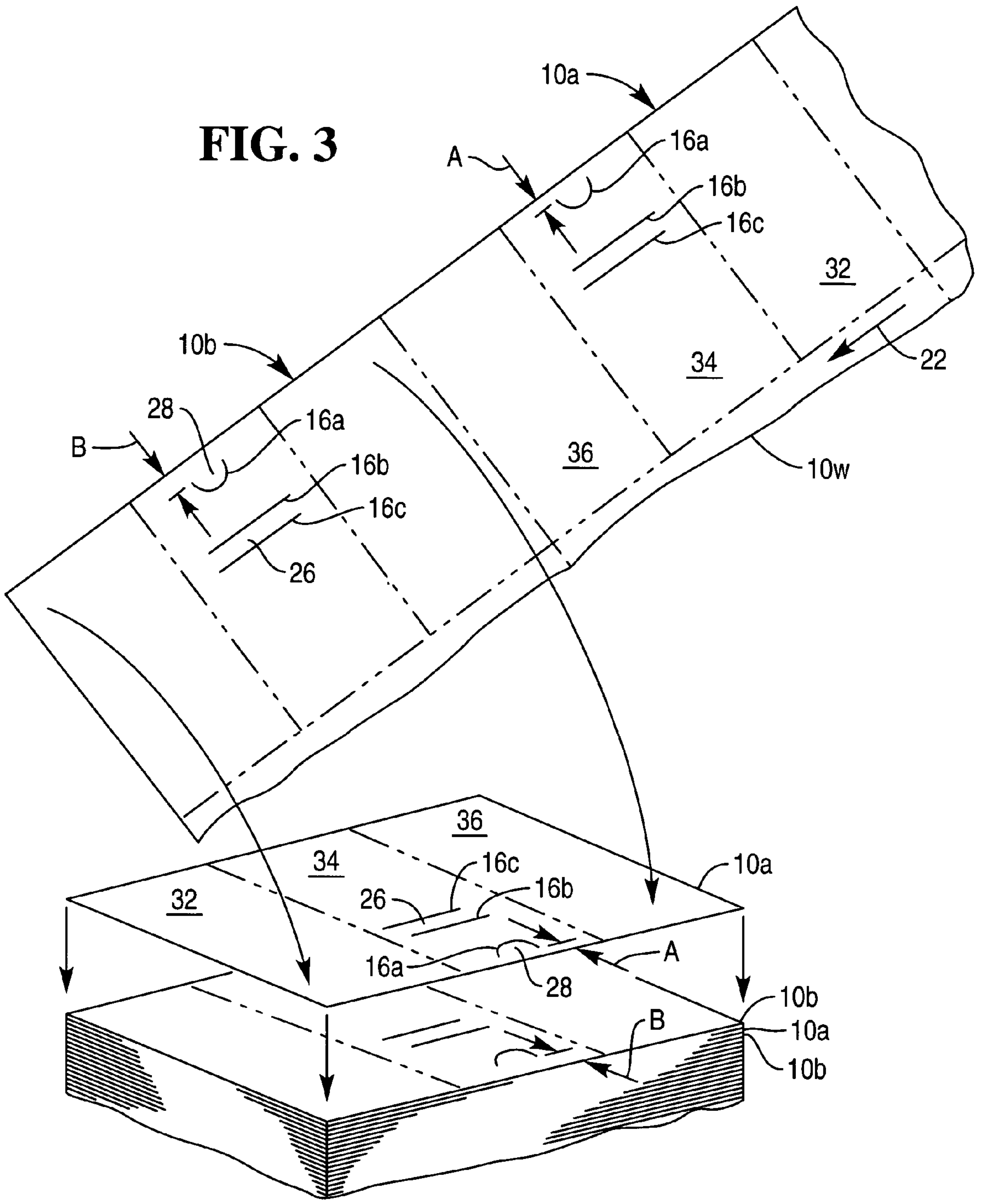
FIG. 3 is an enlarged view of a portion of the web illustrated in FIG. 2 showing a preferred form of the diecut offset in the stack of sheets.

FIG. 3 illustrates an enlarged portion of the web 10*w* shown in FIG. 2 wherein the individual diecuts, designated 16*a,b,c*, are offset from each other laterally or transversely to the running axis of the web. For example, the pattern of diecuts 16*a,b,c* in the first sheet 10*a* is laterally offset from the edge of the web by a predetermined offset A, with a different predetermined offset B in the next sheet 10b in turn. The different offsets, A,B ensure that the respective diecuts are not aligned with each other in the resulting stack of sheets to prevent interlocking of the stacked sheets by the repeating diecuts.

The difference between the two offsets A,B may be about 6 mm, for example, but may be larger or smaller as desired, with the minimum difference between the two offsets being the minimum practical value for preventing alignment of the repeating diecuts which could cause interlocking therebetween. The minimum difference in offsets A–B between the repeating diecuts is a function of the positional accuracy of the forming the diecuts in the traveling web 10*w* using the rotating die 18, and the configuration and orientation of the repeating diecuts.

The typical supply roll 10*r* illustrated in FIG. 2 is commercially available in standard sizes from which one or more of the individual sheets may be formed across the running width thereof transversely to the running axis 22. In the exemplary embodiment illustrated in FIG. 2, the conventional slitting knives are provided for slitting the web 10*w* along the running axis to form three identical smaller webs, each producing a series of the sheets 10*a, b* with the diecuts 16 repeating both along the longitudinal or running axis of the web as well as transversely across the width of the web for the three smaller webs produced from the slitting operation.

In this way, three slit webs may be produced from the common larger web, followed in turn by conventional cutting of the sheets from the three slit webs. The individual flat sheets 10*a, b* formed from the slitting and cutting operations are then suitably stacked in one or more groups, such as the three groups illustrated in FIG. 2. In each of the stacks illustrated in FIG. 2, the sheets are alternately stacked with the corresponding different offsets A,B.

The basic production of cut sheets with diecuts therein is conventional whether made from a single small web or from a larger web slit into two or more smaller webs. The conventional roller die includes cutting edges for the desired diecuts which produces identical diecuts in identical cut sheets both along the running axis of the web as well as transversely across the web for maximizing the production of the sheets in the manufacturing process.

Similarly, the cut sheets 10*a, b* illustrated in FIGS. 1–3 have identical configurations for the intended products therefor, except for the diecuts thereof offset among the sheets to prevent undesirable interlocking therebetween.

In the enlarged view of FIG. 3, the individual flat rectangular sheets 10*a, b* alternate successively over the height of the stack. The adjoining or touching sheets 10*a, b* have corresponding diecuts 16 extending completely through each sheet, and are preferably disposed inboard from the respective perimeters of the sheets at the different offsets A,B from the sheet perimeters. The two configurations of the sheets are designated 10*a* and 10*b* to conform with the corresponding offsets A and B of the diecut patterns therein.

The diecuts 16 may be singular in each sheet, or may be multiple as illustrated in the exemplary embodiment of FIG. 3 in which three different diecuts are used in an identical pattern in each sheet, and designated 16*a*, 16*b*, and 16*c*. The repeating cut sheets are illustrated in FIGS. 1 and 2 additionally with the reference letters A and B shown thereon for improving the correspondence with the detailed view illustrated in FIG. 3.

In FIG. 3, the corresponding diecuts 16*a,b,c* of each successive sheet 10*a, b* repeat from sheet to sheet along the web, but are simply laterally offset from each other by the difference in lateral offset A–B from the perimeter of the sheets. In this way the individual sheets 10*a, b* may remain identical except for the diecuts themselves, which themselves are identical from sheet to sheet, but simply offset slightly from sheet to sheet. The slight offset required from sheet to sheet to prevent undesirable interlocking of the stacked sheets may be as little as a few millimeters between corresponding diecuts, which would not be perceptible to the user unless carefully examined. Accordingly, for all intents and purposes the sheets in the stack are practically identical while eliminating or reducing the potential interlocking problem of otherwise aligned diecuts.

As shown in FIG. 3, the repeating diecuts in the stack of sheets are offset from each other in any two adjoining or adjacent sheets 10*a,b*, but aligned with each other in the next successive sheets. Since the two different offsets A,B define only two different configurations of the sheets 10*a,b*, the different sheets 10*a, b* are stacked alternately in succession for the entire stack, with the diecuts in one sheet being offset from both next sheets above and below that sheet, yet aligned with the next successive sheets above and below those adjacent sheets. In other words, the diecut offsets change and repeat from sheet to sheet between the offsets A and B repeating successively over the entire stack.

In this way, for the two-configuration design of the sheets 10*a,b*, the two offsets A,B repeat in successive sheets and alternate in turn. If desired, three or more different offsets could be used instead of the two different offsets A,B and repeat in any suitable manner throughout the stack of sheets.

In the exemplary embodiment illustrated in FIGS. 1–3, the adjoining sheets 10*a, b* in the stack have corresponding identical patterns of multiple diecuts 16*a,b,c* offset from each other from sheet to sheet by corresponding lateral offsets A,B from the sheet perimeters. Since the pattern of three diecuts 16*a,b,c* is identical from sheet to sheet, the diecut patterns are offset laterally from each other by the corresponding difference in offsets A–B. In other words, each of the multiple diecuts 16*a,b,c* has a correspondingly larger offset from the edge of the sheet, yet the difference in offset between adjacent sheets is preferably identical for each diecut.

As illustrated in most detail in FIG. 3, each of the exemplary diecut patterns includes an arcuate diecut 16*a* in the form of a semicircle, and one or more straight diecuts 16*b,c* spaced laterally therefrom along the transverse width of the web. The arcuate and straight diecuts repeat from sheet to sheet along the running axis of the web, but have common different offsets A,B from sheet to sheet to ensure that the corresponding diecuts are not aligned with each other in the resulting stack of sheets.

In the exemplary embodiment illustrated in FIG. 3, each of the diecut patterns includes a pair of straight and parallel diecuts 16*b,c* which define therebetween a small band 26 spaced laterally from the arcuate diecut 16*a*. Correspondingly, the arcuate diecut 16*a* itself defines a semicircular tab 28.

This configuration of the sheets 10*a,b* defines an exemplary hotel folio as illustrated in FIG. 1 in which a conventional flat magnetic card key 30 may be inserted through the two straight diecuts defining the band 26 down into the arcuate diecut defining the tab 28. The band and tab thusly capture or retain the key in the sheet folio.

In this configuration of the folio sheets 10*a,b* illustrated in FIGS. 1 and 3, each sheet includes three sections defining corresponding pages 32,34,36. The diecut pattern is preferably disposed in the center page 34 between the adjoining front and back pages 32,36.

FIG. 1 illustrates an exemplary use of the hotel folio sheets 10*a,b* in which the stack of sheets is loaded in the printer, and fed individually therethrough for printing any desired print thereon. The stack of sheets 10*a,b* is loaded in the printer with the diecuts 16 being offset laterally or transversely to the feeding path or direction through the printer. In this way, the straight diecuts are aligned with the feeding direction of the printer, and the arcuate diecuts are offset transversely therewith.

The individual folio sheets may therefore be individually transported through the printer without interlocking of the stacked diecuts, and accurately printed thereon in a single pass. The so printed sheet 10*a* is then suitably folded by hand, for example, in three overlapping pages 32,34,36, with the diecuts 16 being disposed in the center page between the front and back pages.

As indicated above, FIG. 3 illustrates two basic forms of the diecuts being arcuate and straight, and arranged in one orientation relative to the running axis of the web, which corresponds with the feeding axis through the printer 12 of FIG. 1. In order to avoid undesirable interlocking of aligned diecuts, straight diecuts may be offset laterally apart and generally normal thereto with a relatively small offset therebetween. In this way, the offset of the straight diecuts is barely perceptible to the intended user without careful observation.

Straight diecuts could also be offset along their longitudinal axes, but this would require an offset as least as large as the length of the individual diecut to avoid any overlap therebetween. This may be acceptable in some configurations, or the longitudinal offset may be smaller and permit some overlap or alignment of the straight diecuts.

The straight diecuts could also be offset by rotation from sheet to sheet, and therefore aligned with each other at a single crossing point. This offset may be acceptable in certain configurations, but might be more visible to the user and aesthetically undesirable.

In contrast, the semicircular arcuate diecut 16*a* illustrated in FIG. 3 would require relatively large rotary offset for minimizing or preventing alignment thereof between the sheets, whereas the small lateral offset is sufficient from sheet to sheet. The offset of the arcuate diecut 16*a* may be in any suitable direction either transversely to the running axis of the web, or along the running axis of the web, or in any intermediate orientation therebetween as desired for the specific product intended.

Since the ubiquitous continuous diecut is found in arcuate or straight forms in various cut sheet products, such diecuts may be conveniently laterally offset from each other in any suitable manner from sheet to sheet in the corresponding stack thereof for preventing diecut interlock. The amount of offset may vary as desired and may be translation only, rotary only, or a combination of both as desired for the particular configuration of the diecuts and intended product.

In the exemplary hotel folio cut sheets illustrated in FIG. 1, the straight and arcuate diecuts are symmetrically positioned in the center page 34 and may be conveniently offset laterally thereon between the opposite edges of the sheet without compromising the functional or aesthetic attributes of the sheet. The small, exemplary 6 mm, lateral offset of the diecut patterns from sheet to sheet in the stack is practically imperceptible to the intended user, with the cut sheets being otherwise identical.

The offset diecut in the stack of sheets may be used wherever desired for eliminating or reducing the possibility of sheet interlocking from aligned diecuts, and therefore has innumerable applications.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

What is claimed is:

1. A stack of alternating first and second stationery sheets having repeating inboard slit diecuts offset from each other in adjoining sheets and aligned with each other in said first sheets and aligned with each other in said second sheets throughout said stack.

2. A stack according to claim 1 wherein said sheets have identical configurations except for said diecuts being offset among said sheets.

3. A loose stack of sheets according to claim 2 wherein said slit diecuts are disposed inboard from respective perimeters thereof at different offsets from said perimeters.

4. A stack according to claim 3 wherein said repeating diecuts are offset laterally from each other.

5. A stack according to claim 3 wherein said diecut in one of said adjoining sheets is aligned with the diecut in a next successive sheet to said adjoining sheets.

6. A stack according to claim 5 wherein said different offsets repeat in successive sheets.

7. A stack according to claim 3 wherein said adjoining sheets have corresponding patterns of multiple diecuts offset from each other from sheet to sheet.

8. A stack according to claim 7 wherein said diecut patterns are offset laterally from each other.

9. A stack according to claim 7 wherein each of said diecut patterns includes an arcuate diecut and straight diecut spaced laterally therefrom.

10. A stack according to claim 9 wherein each of said diecut patterns further includes a pair of straight diecuts defining a band spaced laterally from said arcuate diecut.

11. A stack according to claim 9 wherein said diecut patterns are offset laterally from each other from sheet to sheet.

12. A stack according to claim 9 wherein each of said sheets includes three sections defining corresponding pages, and said diecut pattern is disposed in a center page between adjoining front and back pages.

13. A method of making said stack of sheets according to claim 3 comprising:

unwinding a continuous web from a roll;

cutting said web with a die to form therein repeating diecuts along a running axis of said web, and offset from each other in turn;

cutting said sheets from said web, with each of said sheets having said diecut offset from the next successive sheet; and stacking said sheets with alternating sheets having offset diecuts.

14. A method according to claim 13 wherein said diecuts are offset from each other transversely to said running axis.

15. A method according to claim 13 wherein said diecuts repeat transversely across said running axis without offset therealong, and repeat along said running axis with said offset.

16. A method according to claim 15 further comprising:

slitting said web along said running axis transversely between said repeating diecuts;

cutting said sheets from said slit web; and stacking said sheets from said slit web with alternating sheets having offset diecuts.

17. A method of using said stack of sheets according to claim 3 comprising:

loading said stack of sheets into a printer;

feeding individual sheets from said stack through said printer; and printing print on said sheet fed through said printer.

18. A method according to claim 17 wherein said sheets are loaded in said printer with said diecuts being offset transversely to the feeding direction thereof.

19. A method according to claim 18 further comprising folding said printed sheet in three overlapping pages with said diecut being disposed in a center page between front and back pages.

20. A stack of sheets comprising:

alternating stationery sheets having repeating slit diecuts extending therethrough, and disposed inboard from respective perimeters thereof; and said repeating slit diecuts being differently offset from said perimeters in loose adjoining sheets, with said slit diecut in one of said adjoining sheets being aligned with the slit diecut in a next successive sheet to said adjoining sheets throughout said stack.

21. A stack of first and second adjoining stationery sheets each having an inboard slit diecut, with said first and second sheets alternating successively in the entirety of said stack, with said first sheets being identical in configuration and alignment of said slit diecuts therein, and said second sheets being identical in configuration and alignment of said slit diecuts therein, with said slit diecuts in said first and second sheets being offset from each other to prevent overlap of said slit diecuts between adjacent sheets.

22. A stack according to claim 21 wherein said sheets have identical patterns of multiple diecuts in each sheet offset from each other in said adjacent sheets to prevent overlap of said multiple diecuts between said adjacent sheets.

23. A stack according to claim 22 wherein said diecut patterns are offset differently from respective perimeters of said adjacent sheets.

24. A stack according to claim 23 wherein said different offset is practically imperceptible.

25. A stack according to claim 23 wherein each of said sheets includes three sections defining corresponding pages, and said diecut pattern is disposed in a center page between adjoining front and back pages.

* * * * *